UNITED STATES PATENT OFFICE.

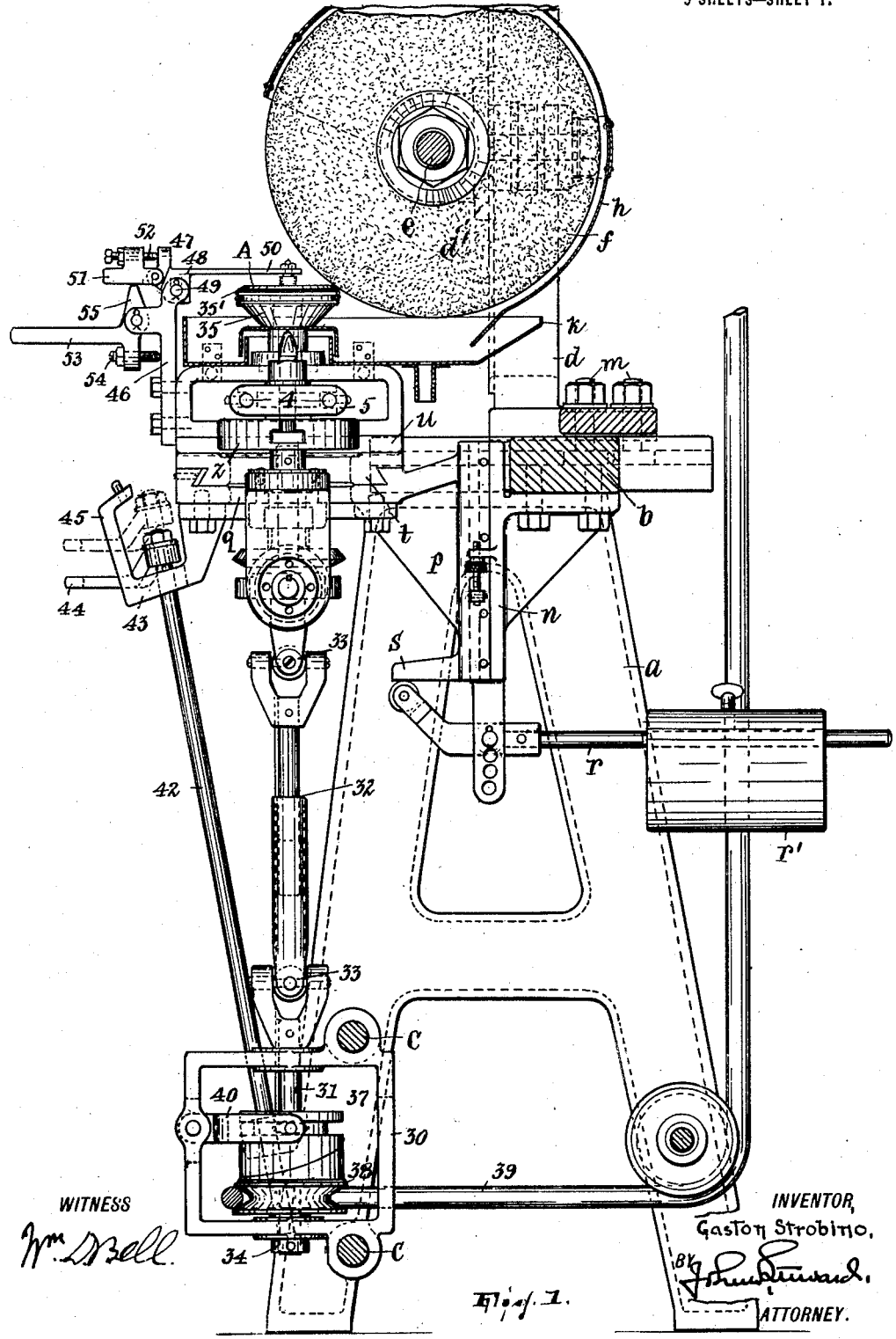

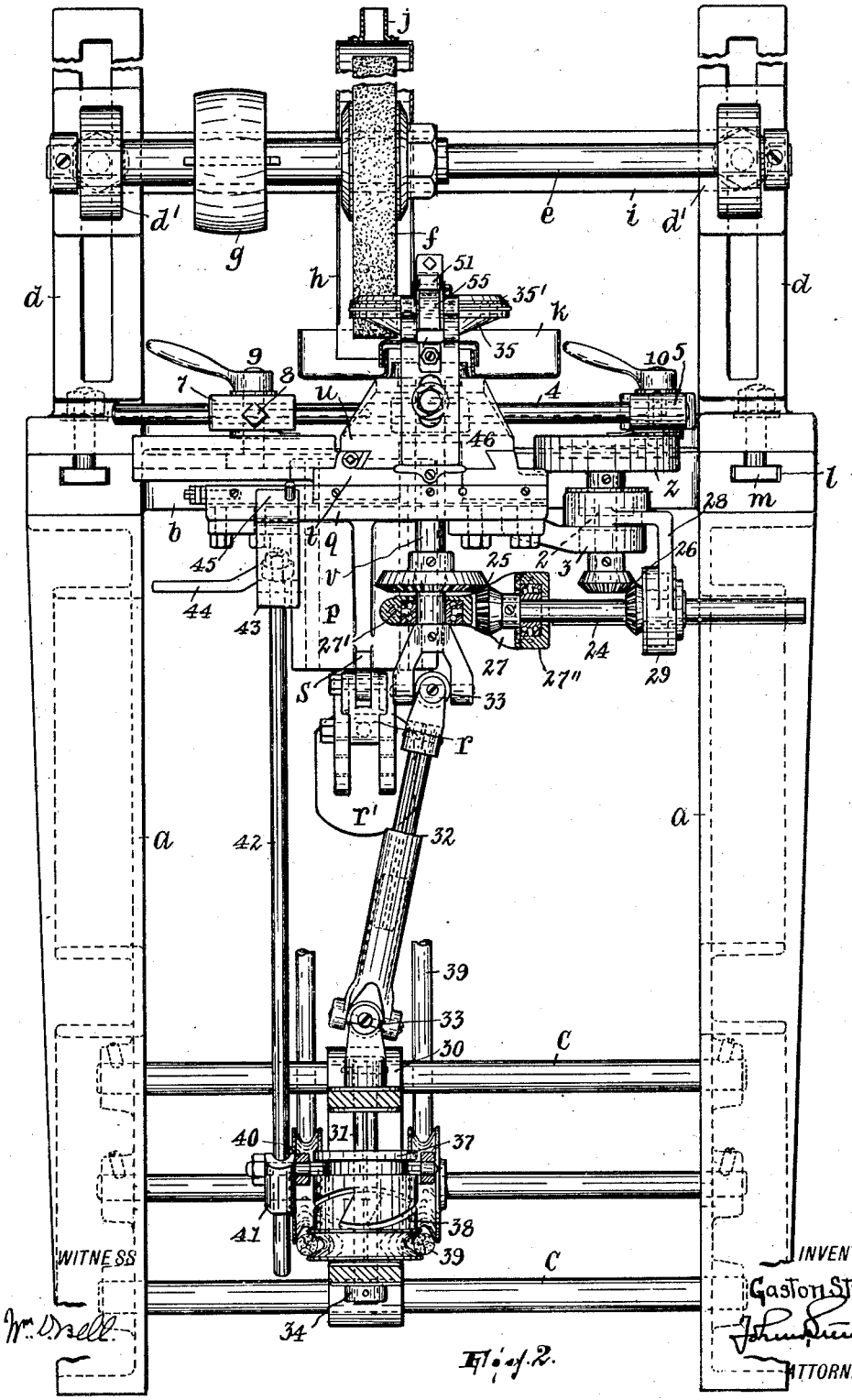

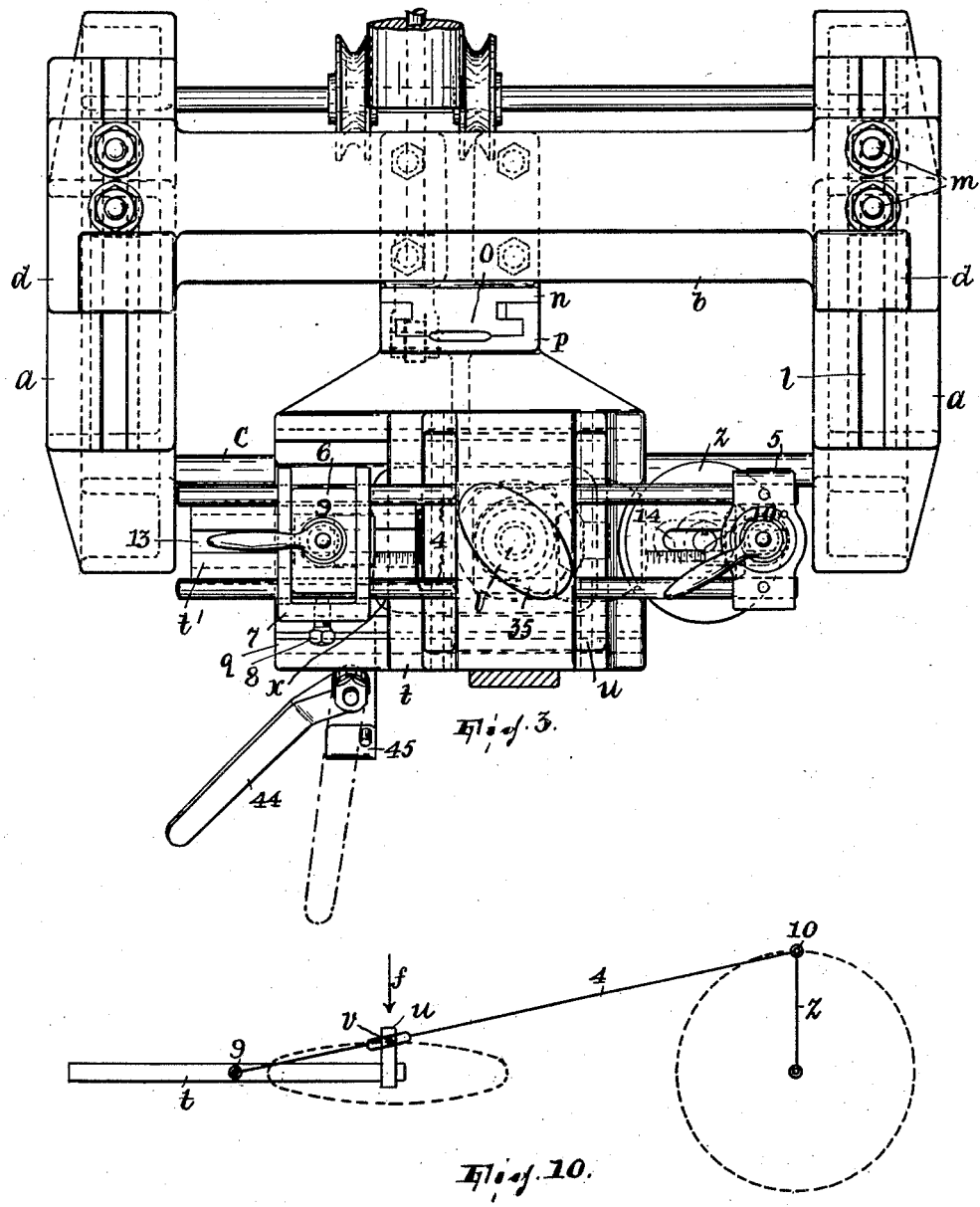

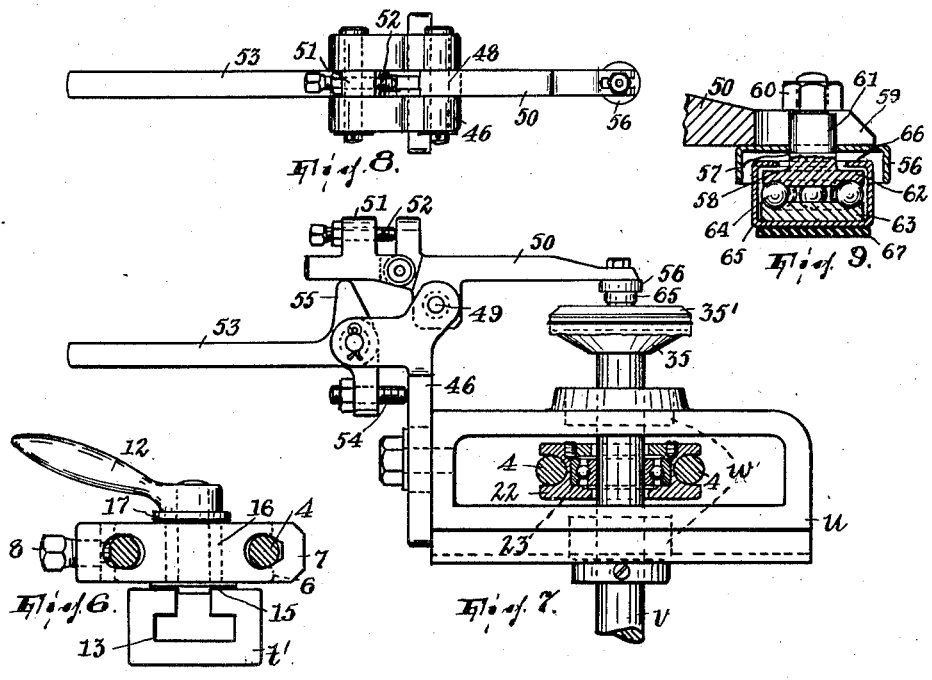
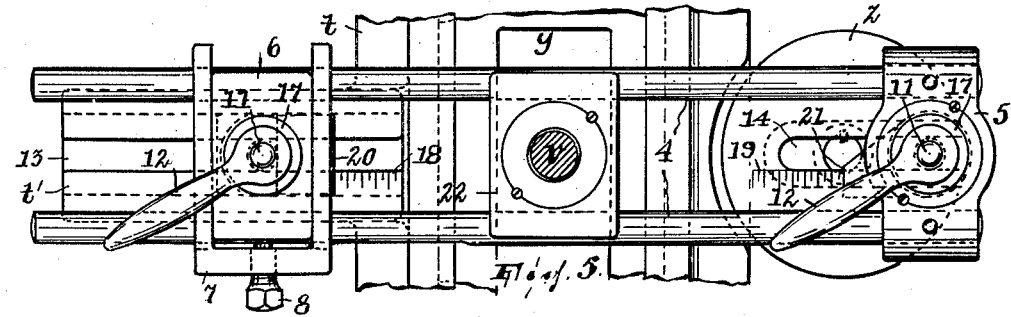
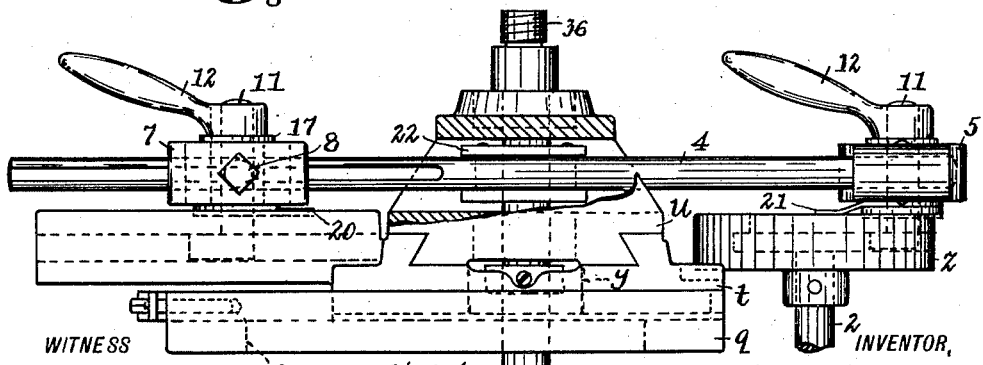

GASTON STROBINO, OF PATERSON, NEW JERSEY.

MACHINE FOR FORMING OVAL OBJECTS.

1,359,545.  Specification of Letters Patent.  Patented Nov. 23, 1920.

Application filed September 2, 1919. Serial No. 321,078.

*To all whom it may concern:*

Be it known that I, GASTON STROBINO, a citizen of the United States, residing at Paterson, in the county of Passaic and State of New Jersey, have invented certain new and useful Improvements in Machines for Forming Oval Objects, of which the following is a specification.

This invention relates to apparatus wherein as between a given tool and the surface of a piece of work upon which it operates there is such relative movement that the tool describes some such course on the work as that represented by an ellipse, and the principal object is to provide a machine wherein such work, for example, as the beveling of the edges of elliptical plates, whatever the size or specific shape thereof may be within certain limits, may be performed with substantial accuracy and without requiring any unusual skill on the part of the attendant.

The accompanying drawings show and the following description sets forth a machine for beveling the edges of plates, as the edges of elliptical mirrors and the like; but it should be understood that none of the details of construction or operation of this particular machine is to stand as a limitation of my invention except as made such in the claims appended to this specification.

In said drawings,—

Figure 1 is a side elevation of said machine, partly in section;

Fig. 2 is a front elevation, also partly in section;

Fig. 3 is a plan view, certain parts being removed;

Fig. 4 is a front elevation and Fig. 5 a fragmentary plan of the principal group of elements of the machine;

Fig. 6 illustrates a detail of what is shown in Figs. 4 and 5;

Fig. 7 illustrates in side elevation principally the work-holding means;

Fig. 8 is a plan of a part of what is shown in Figs. 7 and 8; and

Figs. 10 and 11 are diagrams illustrating the invention.

Figure 11:
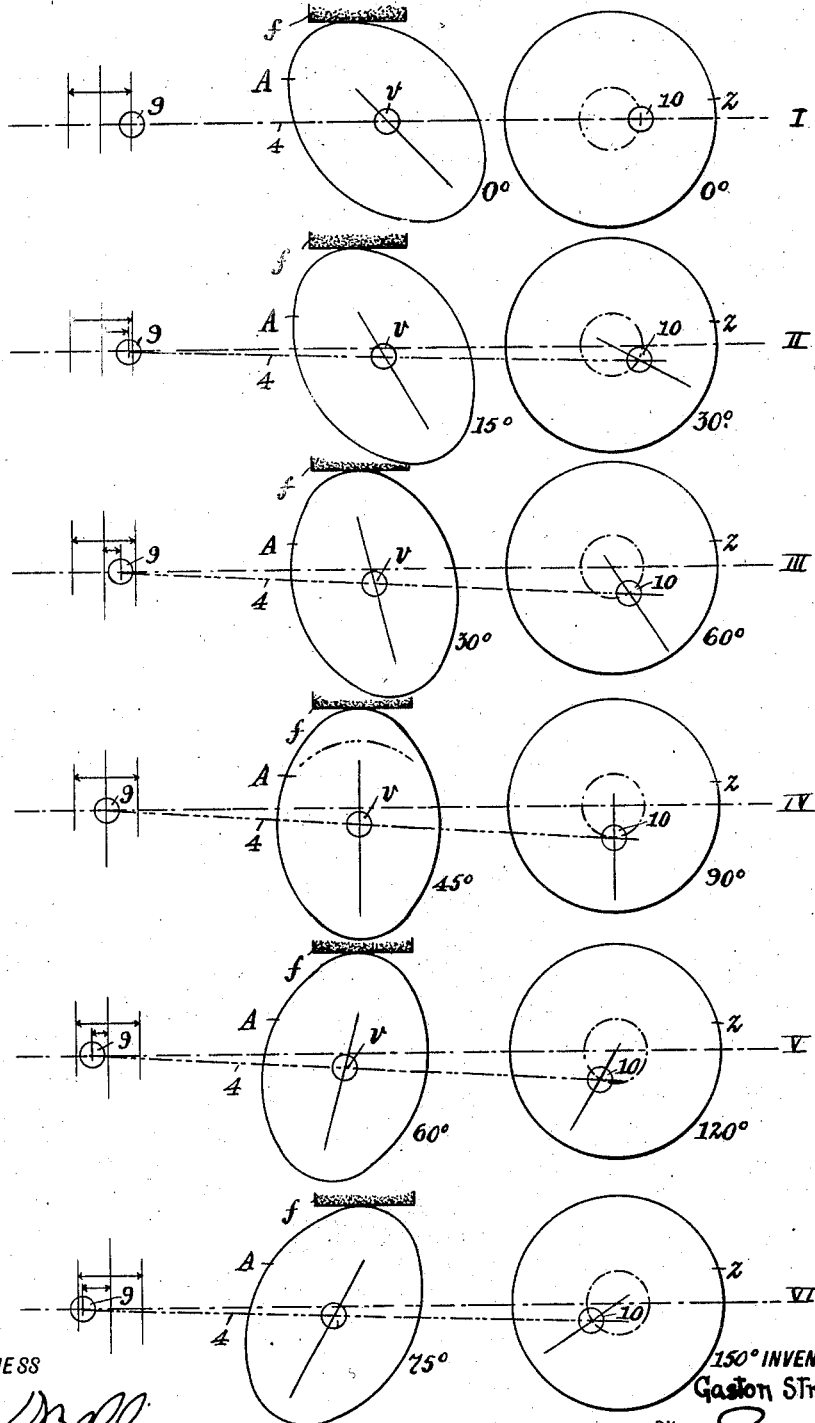

The frame of the machine includes the side frames $a$ connected by the cross-piece $b$ and the parallel tie-rods $c$, such frame being surmounted by the pair of uprights $d$ in vertically adjustable bearings $d'$ in which is suitably journaled the horizontal shaft $e$ carrying the grind-wheel $f$ which may be driven from any source by a belt-driven pulley $g$ thereon, $h$ being a shield for the grind-wheel suitably supported by arms $i$ projecting inwardly from said uprights and having an inlet $j$ for supplying water to the wheel; the water and the grit delivered by the wheel fall from the shield into a pan $k$ supported as hereinafter stated. The superstructure, including the uprights and wheel, may be adjusted forward and back on the frame, $l$ and $m$ being suitable slots and bolts for clamping it where adjusted. This adjustment and of the wheel vertically, as will be obvious, will usually be necessary when after operating with reference to a given ellipse the machine is to operate with reference to another ellipse or to alter the pitch of the bevel.

A bracket $n$ is bolted to the cross-piece and forms a vertical guideway at $o$ at the front thereof (see Fig. 3) for the rear upright portion $p$ of a table $q$, the guideway and the part of portion $p$ engaged therewith being preferably T-shaped in plan. A weighted lever $r$, having its weight $r'$ adjustable thereon so as to vary its pressure, normally holds the table elevated by pressing at its free end against a toe $s$ on the part $p$, so that the work is held against the grind-wheel, but upon pressing the table down by hand and turning the handle of a certain lock device to be described the table may be held depressed, with the work clear of the wheel.

There are two slides or carriages $t$ and $u$ movable at right angles to each other in horizontal planes. The slide $t$ moves transversely on and has a dove-tailed tongue-and-groove connection (Fig. 1) with the table $q$, and the slide $u$ moves forward and back on and has similar connection with slide $t$ (Fig. 2). A vertical shaft $v$ is journaled in bracket $u$ and is held therein against vertical movement by suitable thrust devices $w$ (Fig. 7), and so that this shaft may not interfere with the forward and back movement of slide $u$ in the table and slide $t$ in slide $u$ the table and slide $t$ are apertured, as at $x$ (Figs. 3 and 4) and $y$ (Fig. 5). The motion of both slides, each reciprocating, is imparted from an eccentric point on a suitable rotating element through the medium of a connecting rod which at one end is pivoted to said element at said point and at the other end is pivoted to slide $t$ and which is also connected to slide $u$. The said rotating element is a disk $z$ on the upper end of a vertical shaft 2 journaled in a bracket 3 secured to table $q$. The connecting rod comprises a pair of parallel bars 4 having a fixed head 5 at one end and another head on the other end adapted to be adjusted longitudinally of the rod, the latter consisting of a block 6 recessed at opposite sides to receive the bars and a U-shaped clip 7 whose legs are penetrated by the bars and which has a set screw 8 for exerting clamping pressure in opposite directions on the clip on the one hand and the bars and block on the other (Figs. 5 and 6). The pivots between the rod and disk and rod and slide $t$, designated generally by the characters 9 and 10 in Figs. 2 and 3, are afforded by substantially similar devices, so description of one will serve for both (Figs. 4 to 6); thus: 11 is a T-bolt and 12 a hand-nut screwed on the upper end thereof. There is a T-slot 13 formed longitudinally of and in the tail $t'$ of slide $t$, and a similar radial slot 14 formed in the disk $z$, each of such slots receiving one of the T-bolts. On each bolt is a plate 15 (to bear on the tail $t'$ or disks $z$ over its slot), a bushing 16 resting on the plate, and a washer 17 resting on the bushing, and on tightening the hand-nut the bushing will obviously be clamped in fixed relation to the slotted tail (or the disk). The bushings respectively form bearings for the head 5 and block 6, which they penetrate. The arrangement is such that the pivot devices thus provided may be adjusted longitudinally of the slots; this adjustment is preferably effected by reference to scales 18 19 which adjoin said slots, the pivot devices having pointers 20 21 to coöperate with said scales. The connection between the connecting rod and slide $u$ is afforded by a block 22 into opposite sides of which (Fig. 7) the bars 4 are recessed and which is penetrated by and has a bearing 23 for the shaft $v$. It will be obvious that on rotation of the disk $z$ the connecting rod will impart reciprocating motion not only to slide $t$ but to slide $u$, and that the resultant of these two motions so far as any point in slide $u$ is concerned (for example, shaft $v$) must be motion in an endless path, which, under the conditions shown and described, will have the form of an ellipse whose greater axis is longitudinal of the thrust of slide $t$. So far as I am aware it is new, in apparatus wherein as between a given tool and the surface of a piece of work upon which it operates there is such relative movement that the tool describes on the work a curved course, to effect said movement by a rotating element, slides arranged to reciprocate one in and transversely of the path of movement of the other, and a connecting rod which translates the rotary movement of said element into rectilineal movement of the latter slide, by connecting these two, and at the same time and as an incident to its pivotal movement with reference to said latter slide imparts rectilineal movement to the former slide. It will further be obvious that by adjusting the pivot devices the shape and size of the figure delineated will be altered.

There is a horizontal shaft 24 which, through the medium of bevel gearing 25, is connected with shaft $v$ and through the medium of bevel gearing 26 is connected with shaft 2; in the present example, therefore, the disk $z$ is rotated from the shaft $v$, and for a purpose to be explained it may be remarked that their speed-ratio is as 1 to 2, the gearing 25 being 1 to 2 and the gearing 26 1 to 1. A suitable bracket 27, affording at 27' and 27'' bearings for the shafts $v$ and 24 and supported as hereinafter stated, and another bracket 28, supported by bracket 3 and having a bearing 29 for the member of the gearing 26 which is on shaft 24, support said shaft 24; since the latter shaft must reciprocate with slide $t$ it has a splined connection with the member of gearing 26 which is arranged on it, as shown, which member is confined against axial movement by its bearing 29.

In a bracket 30 which may be adjusted laterally on the tie-rods $c$ is journaled a vertical shaft 31. Between shafts $v$ and 31 is a shaft 32, made in two sections telescoped and splined together, so as to be variable in length, which is connected to the shafts $v$ and 31 by the universal joints 33; the uppermost member of the upper joint 33 serves to support the bracket 27 above referred to while the lowermost member of the lower joint 33 coacts with a collar 34 on the lower end of shaft 31 to prevent vertical movement of said shaft in bracket 30. A plateau 35 having a felt or equivalent cover 35' to support and hold the plate or equivalent to be operated upon by the grind-wheel $f$ is fixed, as by being screwed, on the threaded upper end 36 (Fig. 4) of shaft $v$. This plateau, as will appear, has a planetary movement, that is, it rotates around the axis of shaft $v$ and at the same time it travels with said shaft in an endless course due to the reciprocation of the slides in transverse paths. Splined on the shaft 31 is a clutch member 37 and freely revoluble thereon is a clutch member 38 which may include as shown a pulley to receive a suitably driven endless belt 39. There is a fork 40, pivoted in bracket 30, for raising and lowering clutch member 37 to disestablish or establish the clutch, and pivoted to this fork is a shackle 41 in which a rod 42 is held so as to be longitudinally adjustable therein, the rod being guided at its upper end in a bracket 43 depending from the table 2 and said rod having a handle 44 rotative thereon into position to hook over an upward projection 45 of said bracket. Assuming the work to be held against the rotating grind-wheel by the weighted lever r', to clear the work from the grind-wheel the operator raises the lock device 42—44 until the upward movement of clutch member 37 is stopped by the bracket 30 which disestablishes the clutch and stops the rotation of shaft v, and then depressing the table q by hand turns the handle 44 so that it will overlie bracket 43 and hold down the table.

The work, here shown as a glass lens A, having a certain elliptical form, is held fixed on the plateau as follows: A bracket 46 is secured to slide u and affords a fulcrum for a lever 47 preferably comprising, with the body part 48 fulcrumed on a pin 49 in the bracket and having a preferably rigid arm 50 to extend over the work, an extension or arm 51 pivoted to the part 48 and having a set screw 52 to abut the same. Below arm 51 is fulcrumed a lock lever 53, whose downward movement is limited by the contact of a stop screw 54 with the bracket (a toe 55 on the lever then bearing upwardly against the arm 51 and holding the arm 50 of lever 47 pressed downwardly) and whose upward movement will obviously release the lever 47 so as to leave the work A free to be removed. Screws 52 and 54 permit adjustment of the parts, mainly to obtain the proper holding pressure on the work. The arm 50 of lever 47 carries a toupee, the acting element of which is adapted to frictionally grip the plate A and rotate therewith freely with respect to the lever arm 50, thus: There is an inverted cup-shaped sheath 56 clamped between the arm 50 and a shoulder 57 on a stud 58 which penetrates and is adjustable in a slot 59 in said arm, being secured in place by a nut 60 and having flats 61 to keep it from turning in the slot. Stud 58 projects upwardly from a disk 62 between which and another disk 63 are balls 64 having suitable races in the disks, and disk 63 is contained within the cup-shaped work contact member 65 which has an inturned flange 66 overlying the edge of disk 62 and on its lower face has a pad 67 of some material, as felt, leather or rubber, which will obtain a good grip on the work. It will be understood that the sheath keeps the water that is fed to the grind-wheel and the discharged grit from access to the balls and their races.

When the grind-wheel is rotating and the lock-device has been operated to release the table q and clutch member 37 shaft v will be rotated, turning the work A on its own axis, and at the same time through the described connections it will rotate disk z and so actuate the slides, thus causing the rotating work to move in an endless course. In the present instance, as stated, this course will be elliptical, the longer axis of the ellipse being longitudinal of the path of movement of slide t: See Fig. 10, in which lines z and 4 stand for the disk and connecting rod and points 9, v and 10 for the pivot 9, shaft v and pivot 10, respectively. The grind-wheel f (indicated in this diagram by an arrow with the same reference character) is usually arranged on its shaft so as to be central of the length of the ellipse. Now it will be apparent that, whereas the motion produced—to wit, of point v in an elliptical course—would be useful wherever it is desired to cause a tool to delineate some chosen elliptical outline upon a surface, where the tool is to operate edgewise of the work (as in forming a bevel on and around a plate) in connection with the herein disclosed means for producing this motion either there must be means to cause the tool always to face the work (entailing more or less difficulties and complications of parts) or, the tool being fixed, the work must be rotated to present its edge progressively to the tool. The latter is the condition adopted in the present invention where the principal and ultimate object of performing an edge operation on and around the work is to be accomplished, and having observed that if a sheet were assumed to be attached to the plateau in a horizontal plane and the plateau rotated on its own axis, as v, while proceeding in its orbital course, a fixed point opposite one face of such sheet would delineate thereon a figure which would be the resultant of the elliptical and rotary motions, I have utilized these two motions to attain for the purpose in hand. Thus, for example, I have found that if such sheet be rotated on axis v at one-half the speed of disk z the resultant figure described on the sheet by said point would be a half-ellipse, and in view of this, with a lens A having some definite elliptical shape and size placed on the plateau and the machine adjusted to suit such shape and size, the lens, rotating and moving orbitally, will preserve through its entire revolution substantially that condition of contact with the grind-wheel which at the start is determined as necessary in order to accomplish the work in hand, for example, some particular depth of bevel, the grind-wheel operating on one-half of the lens periphery for each complete revolution of the disk z. This will be apparent from Fig. 11, where the relative positions of the disk z and lens A at several points in their cycles through 150° and 75°, respectively, are indicated at I to VI. In view of this diagram it will be apparent that the relative positions of disk z and the plateau (whose shape approximately conforms to the particular lens to be ground) should be such that when the disk occupies the position shown in Fig. 10 one flat side of the plateau ellipse will be next to the grind-wheel; for it is the movement of the disk through 180° from that position and the consequent shifting of the connecting rod and slide $u$ from greatest proximity to greatest remoteness from the grind-wheel which result in one end or the other of the ellipse being presented to the grind-wheel.

It is known that if an elliptical body be rotated in contact with a surface with its axis confined to a line extending from the surface, as perpendicular thereto, though said body may shift to and from said surface along said line as the rises and falls of its contour are presented thereto the point of contact will shift laterally back and forth. It is advantageous to avoid this in edge-operation machines, for example, to permit narrow-width wheels to be used, and on reference to Fig. 10 it will be seen that this advantage characterizes my invention, since, due to the compensatory shifting of the lens bodily in the direction of movement of slide $t$, the point of contact of the lens with the wheel lies always in the same plane of the wheel.

In the present machine the distances 9—$v$ and $v$—10 are equal, which simplifies the calculations incident to adjusting for different shapes of ellipses, thus:

Assuming one flat side of the lens to be set against the grind wheel, at which time the point 10 would be 180° from where it is in Fig. 11 at IV, the problem of course is to obtain a throw of rod 4 away from the grind-wheel which will leave the lens also in contact with the grind wheel when in position IV, or a throw equal to the difference between the greatest and least radius of the lens (see the dotted arc at IV in Fig. 11). With point $v$ midway between points 9 and 10, which means that the throw of $v$ is one-half that of 10, it is only a matter in any case of adjusting point 10 from the center of disk $z$ a distance equal to the difference between the said two radii of the lens.

Having thus fully described my invention, what I claim as new and desire to secure by Letters Patent is:—

1. Means to hold two elements, one the work and the other a tool, and move one in a curved path relatively to the other including, with a frame having means to hold one such element, a rotary member journaled in the frame, a slide guided for rectilineal movement in the frame, another slide guided for rectilineal movement in the first slide crosswise of the path of movement thereof and having means to hold the other element, and an actuating rod for both slides pivotally connecting the first slide with an eccentric point on said member and having bearing laterally of itself against the second slide.

2. Means to hold two elements, one the work and the other a tool, and move one in a curved path relatively to the other including, with a frame having means to hold one such element, a rotary member journaled in the frame, a slide guided for rectilineal movement in the frame, another slide guided for rectilineal movement in the first slide crosswise of the path of movement thereof and having means to hold the other element, and an actuating rod for both slides pivotally connecting the first slide with an eccentric point on said member and having bearing laterally of itself against the second slide, the connection between said rod and member being adjustable radially of the latter.

3. Means to hold two elements, one the work and the other a tool, and move one in a curved path relatively to the other including, with a frame having means to hold one such element, a rotary member journaled in the frame, a slide guided for rectilineal movement in the frame, another slide guided for rectilineal movement in the first slide crosswise of the path of movement thereof and having means to hold the other element, and an actuating rod for both slides pivotally connecting the first slide with an eccentric point on said member and having bearing laterally of itself against the second slide, the connection between said rod and the first slide being adjustable longitudinally of the latter.

4. In combination, with a frame, a tool arranged therein, carrying means for the work movable in a plane and having a work-holding member revoluble therein on an axis penetrating said plane, and means to move the carrying means in said plane in an elliptical course and simultaneously rotate said member thereof and the work on said axis.

5. In combination, with a frame, a tool arranged therein, carrying means for the work movable in a plane and having a work-holding member revoluble therein on an axis penetrating said plane, means to confine said carrying means to an elliptical course in said plane and means, gearing said member with the latter means, for rotating said member on said axis while the carrying means is moving in said course.

6. In combination, with a frame, a tool arranged therein, carrying means for the plate to be operated upon movable in a circuit and also in a plane and having a plate-holding member revoluble therein on an axis penetrating said plane, the tool being arranged opposite and adapted to operate on the periphery of the plate, means to move said carrying means in said circuit and plane, and means to rotate said member while the carrying means is in motion.

7. In combination, with a frame, a tool arranged therein, carrying means for the work to be operated upon movable in a plane and having a work-holding member revoluble therein on an axis penetrating said plane, and means to move the carrying means in said plane in an elliptical course and simultaneously rotate said member on said axis, the last named means having means to confine the rotating and orbital movements of said member and carrying means to a 1 to 2 ratio.

8. In combination, a frame, a pair of slides, one movable in the frame and the other in the first-named slide in paths crosswise of each other but in parallel planes, a support rotative in the second slide on an axis substantially perpendicular to said planes, a tool element, said tool element and the work being adapted to be carried one by the frame and the other by said support, and means to move said slides in said paths and rotate said support on said axis simultaneously.

9. In combination, with a frame, a tool therein, depressible mechanism in the frame to hold the work against the tool and normally held elevated, said mechanism including a rotary work-supporting means, rotary driving means, a clutch movable independently of said mechanism to connect and disconnect said work-supporting means and driving means, and a connection to lock down the depressed depressible mechanism and hold the clutch in the disconnecting position.

10. In combination, with a frame, a rotary member journaled therein, a rod pivoted at one end to an eccentric point of said member, a slide to which the other end of the rod is pivoted movable rectilineally relatively toward and from said member, another slide movable crosswise of the path of and in the first slide and also crosswise of the axis of said member, the second slide being engaged and being adapted to be moved by the rod, a work-holder journaled in the second slide, and means to gear the work-holder and said member together for rotation together.

In testimony whereof I affix my signature.

GASTON STROBINO.